United States Patent [19]

Kimura

[11] Patent Number: 4,857,079

[45] Date of Patent: Aug. 15, 1989

[54] CO-POLY (IMIDE ETHER) COPOLYMER FROM DIAMINATED POLYALKYLENEGLYCOL

[75] Inventor: Yoshiharu Kimura, Ohmihachiman, Japan

[73] Assignee: TOA Nenryo Kogyo K.K., Tokyo, Japan

[21] Appl. No.: 180,636

[22] Filed: Apr. 7, 1988

Related U.S. Application Data

[62] Division of Ser. No. 919,869, Oct. 17, 1986, abandoned.

[51] Int. Cl.⁴ .............................................. B01D 53/22
[52] U.S. Cl. ...................................... 55/16; 528/353; 528/125; 528/128; 528/172; 528/173; 528/188; 528/220; 528/229; 528/352
[58] Field of Search ............................................. 55/16

[56] References Cited

U.S. PATENT DOCUMENTS

| | | | |
|---|---|---|---|
| 3,812,082 | 5/1974 | Jones | 55/16 |
| 3,981,847 | 9/1976 | Meyer et al. | 55/16 |
| 4,156,597 | 5/1979 | Browall | 55/16 |
| 4,378,400 | 3/1983 | Makino et al. | 55/16 |
| 4,528,004 | 7/1985 | Makino et al. | 55/16 |
| 4,705,540 | 11/1987 | Hayes | 55/16 |
| 4,717,394 | 1/1988 | Hayes | 55/16 |
| 4,746,474 | 5/1988 | Kohn | 55/16 |

*Primary Examiner*—John Kight
*Assistant Examiner*—Frederick Krass
*Attorney, Agent, or Firm*—Birch, Stewart, Kolasch & Birch

[57] ABSTRACT

A novel co-poly (imide ether) copolymer consisting essentially of an organic acid dianhydride, a diamine, and a diaminated polyether, wherein the percentage of the diaminated polyether in the total amount of the diamine and the diaminated polyether is 5 to 40% by weight.

7 Claims, No Drawings

CO-POLY (IMIDE ETHER) COPOLYMER FROM DIAMINATED POLYALKYLENEGLYCOL

This application is a divisional, continuation-in-part, of application Ser. No. 919,869 filed on Oct. 17, 1986, now abandoned.

BACKGROUND OF THE INVENTION

I. Field of the Invention

This invention relates to a novel co-poly(imide ether)copolymer. A film made of this novel copolymer may be used as an oxygen separator.

II. Description of the Prior Art

Polyimide copolymers are conventionally produced by polycondensing an organic acid dianhydride and a diamine in a polar solvent at a low temperature to form a polyamic acid precursor, and by heating the resulting polyamic acid precursor to dehydrocyclize the same. The thus produced polyimide resins have great mechanical strength, heat resistance and light resistance and consequently, they have wide uses. For example, they are useful as electronical parts materials, heat-resistant films, paints, adhesives, and the like.

However, the thus produced polyimide resins have poor solubility and moldability and accordingly, in producing a molded polyimide resin manufacture, the polyamic acid precursor thereof is initially molded by a casting method, and after evaporating the solvent, the molded precursor is heated to form a molded polyimide resin manufacture. Therefore, the polyimide resin block has limited number of uses. To improve the moldability of a polyimide resin, it is known to conventionally modify the polyimide by copolycondensing a third component with the polyimide polymer. It has been found that by selecting the third component, it is possible to add a new function or a property to the polyimide, while still retaining the useful properties of polyimide.

SUMMARY OF THE INVENTION

The object of the present invention is to provide a novel polyimide resin having great heat resistance, light resistance and a high gas-permeability.

Another object of the present invention is to provide a novel polyimide resin from which an oxygen-separating film can be produced.

These and other objects of the present invention can be accomplished by providing a co-poly (imide ether) copolymer consisting essentially of:

(A) organic acid dianhydride of the formula (I):

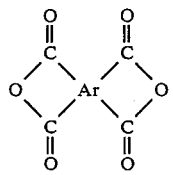

wherein Ar represents

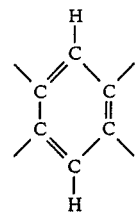

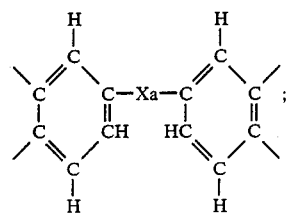

wherein Xa represents —O—, or —CH$_2$—

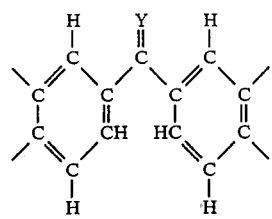

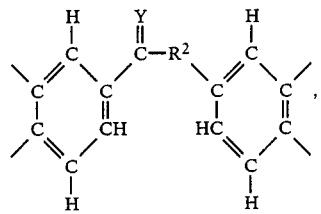

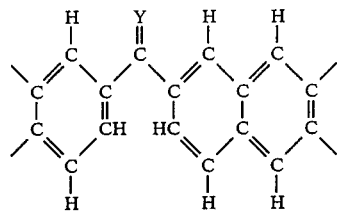

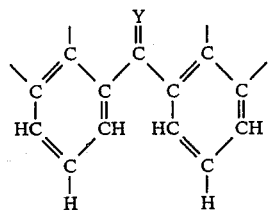

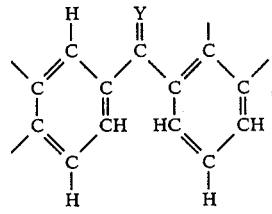

-continued
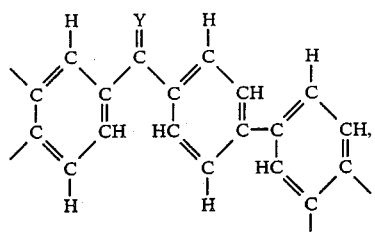
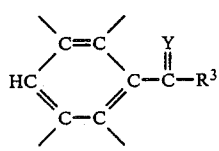
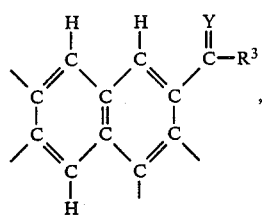
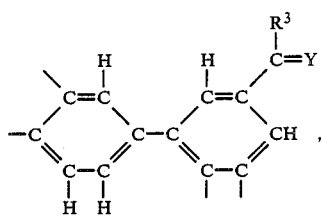
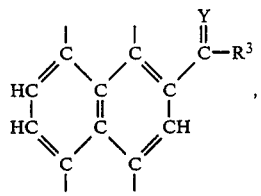
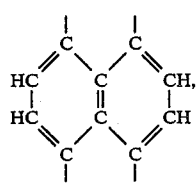
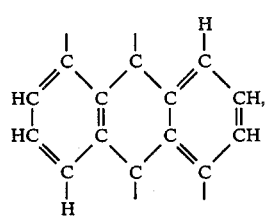
-continued
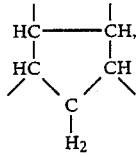
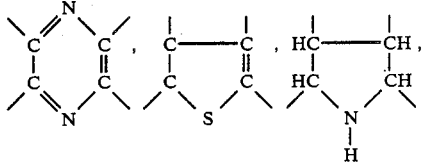
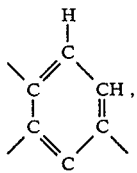
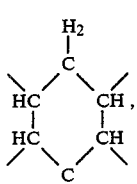
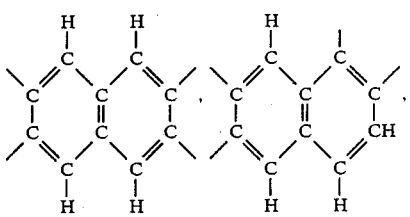
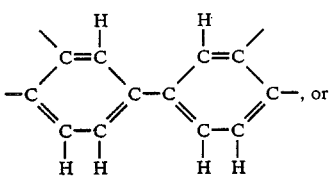
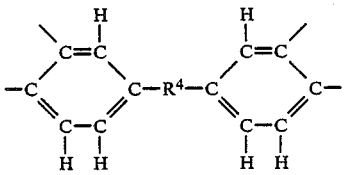
wherein =Y represents =O or =N—$R^5$—$NH_2$, wherein $R^5$ represents a divalent organic group, $R^2$ represents alkylene or arylene, $R^3$ represents alkyl, and $R^4$ represents an alkylene group having at least 2 carbon atoms.
(B) diamine of the formula (II)
$$H_2N\text{—Re—}NH_2 \qquad (II)$$
wherein Re represents

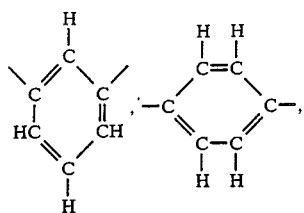

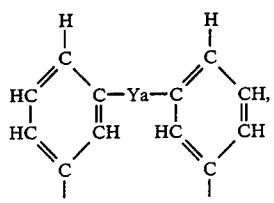

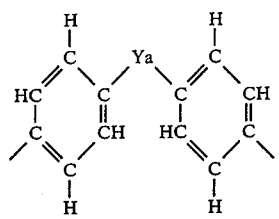

wherein Ya represents

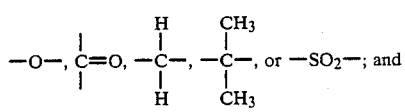

(C) di-aminated poly ether of the formula (III):

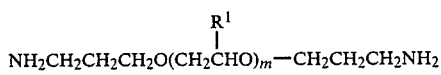

wherein $R^1$ represents hydrogen or methyl, m represents an integer from 3 to 300; the percentage of the component (C) in the total of components (B) and (C) being 5 to 40% by weight, the molecular weight of the copolymer being 5000 to 100,000.

The polyimide copolymer of the present invention has great heat resistance, light resistance and gas permeability. The moldability of the copolymer of the present invention is an improvement over that of polyimide, while its mechanical strength, acid resistance and alkali resistance is comparative to that of polyimide. Further, since the polyimide copolymer of the present invention has a much greater permeability to oxygen than to nitrogen, the film made of the copolymer of the present invention can be used as an effective oxygen separator and which can be used at a high temperature.

DETAILED DESCRIPTION OF THE PREFERRED EMBODIMENTS

The first component of the copolymer of the present invention is an organic acid diahydride of the formula (I).

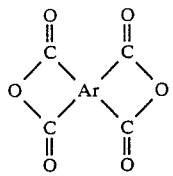

(I)

wherein Ar represents

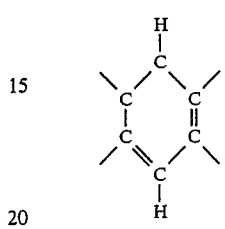

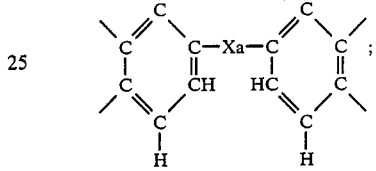

wherein Xa represents —O—, or —CH$_2$—,

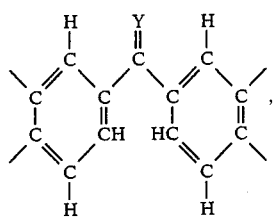

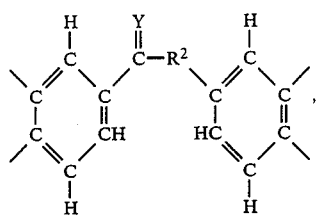

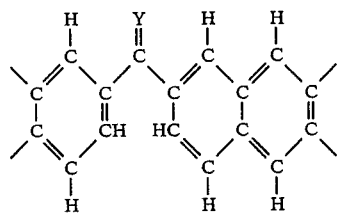

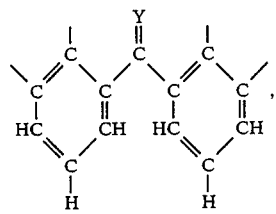

-continued
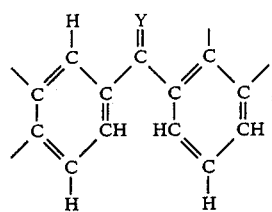
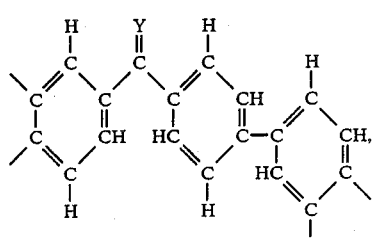
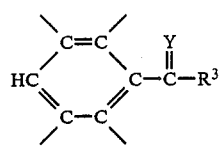
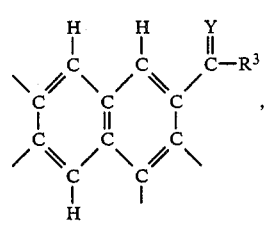
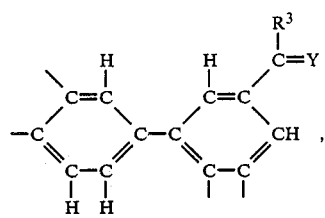
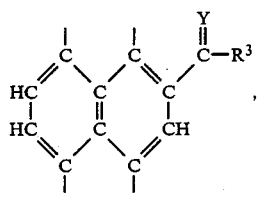
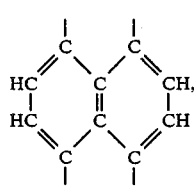
-continued
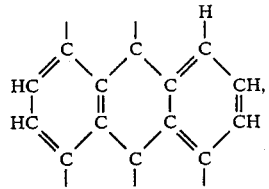
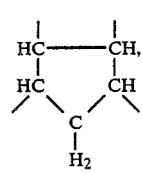
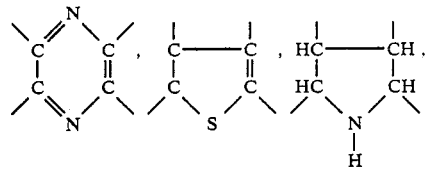
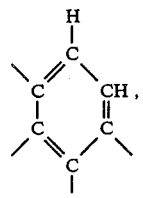
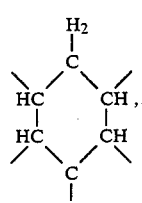
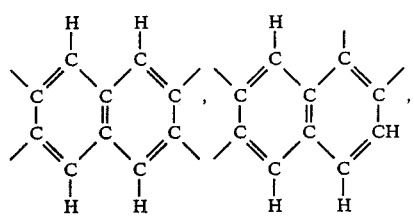
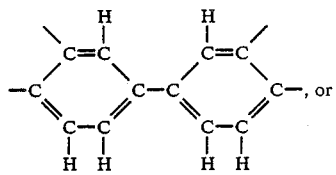
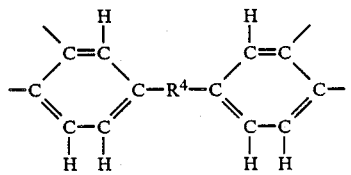
wherein $=Y$ represents $=O$ or $=N-R^5-NH_2$, wherein $R^5$ represents a divalent organic group, $R^2$ represents alkylene or arylene, R³ represents alkyl, and R⁴ represents an alkylene group having at least 2 carbon atoms.
The preferred examples of the group Ar include those represented by the following formulae:
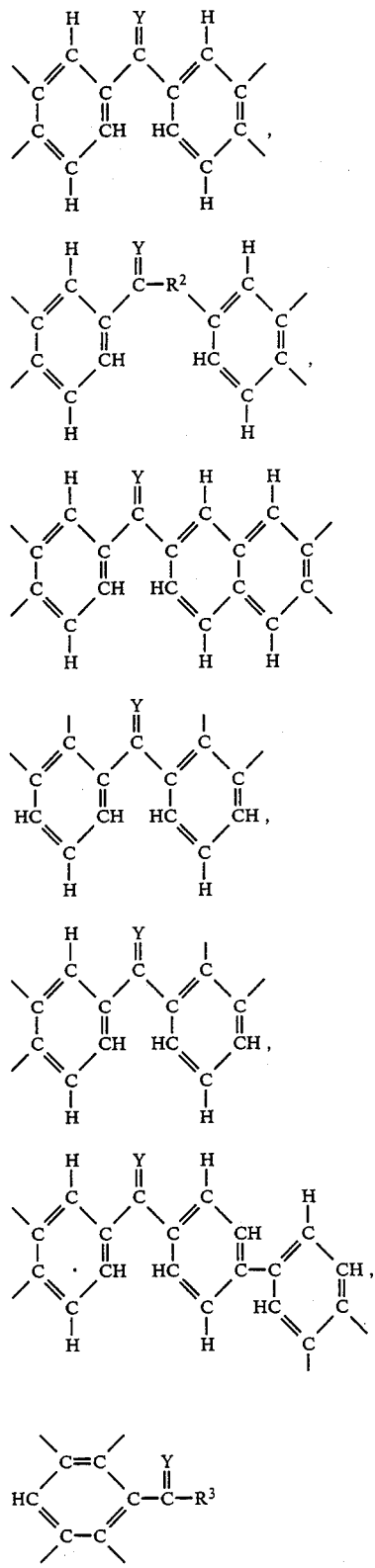
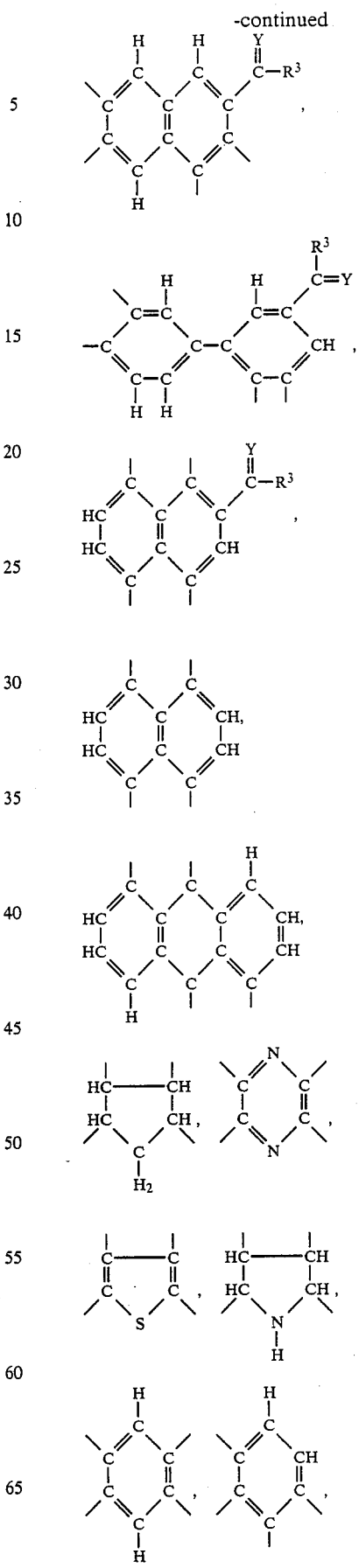

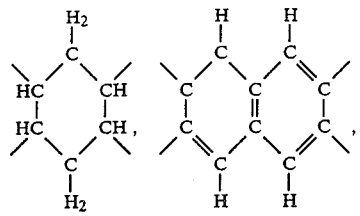
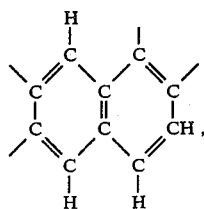
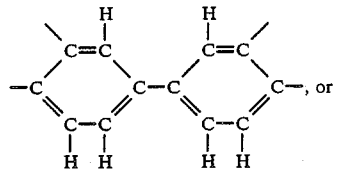
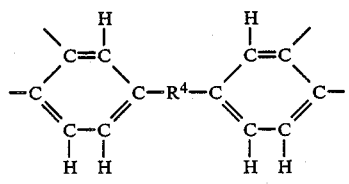

wherein =Y represents =O or =N—R⁵—NH₂, wherein R⁵ represents a divalent organic group, R² represents alkylene or arylene, R³ represents alkyl, and R⁴ represents an alkylene group having at least 2 carbon atoms. R⁴ may also be the following divalent groups:

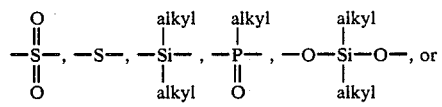
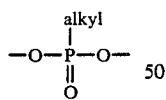

wherein the alkyl groups in these formulae may be substituted by an aryl group such as a phenyl group.

The preferred examples of the divalent organic group R⁵ include those represented by the following groups:

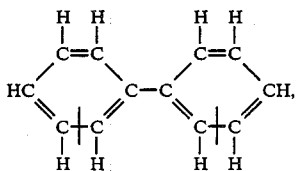
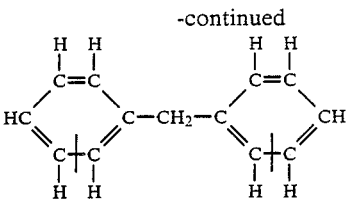
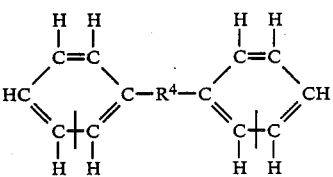
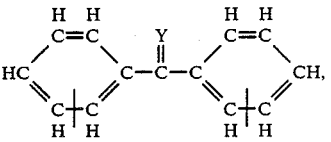
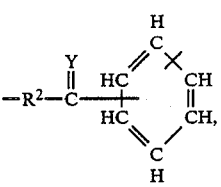
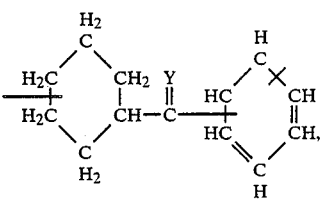
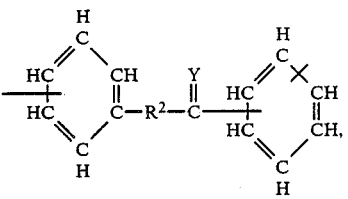
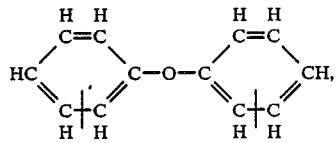
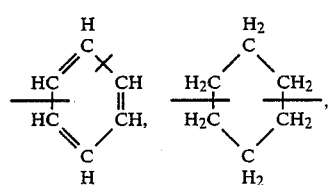
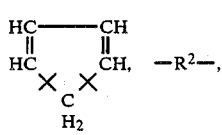

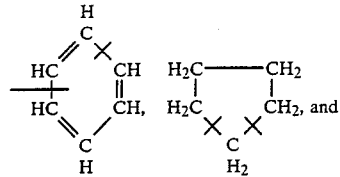
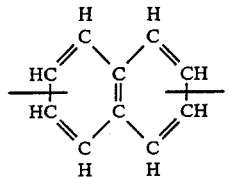

wherein Y, R² and R⁴ represent the same groups as stated above.

$R^2$ to $R^5$ may optionally be substituted by halogen, $NO_2$, COOH, COOZ (wherein Z represents alkyl, aryl, alkaryl, or aralkyl group).

The examples of the organic acid dianhydride which may preferably be used in the present invention include: pyromellitic acid dianhydride,
3,3′,4,4′-diphenyltetracarboxylic acid dianhydride,
1,2,5,6-naphthalenetetracarboxylic acid dianhydride,
2,2′,3,3′-diphenyltetracarbonic acid dianhydride,
4,4′-isopropylidenediphthalic acid dianhydride,
4,4′-sulfonyl-diphthalic acid dianhydride,
3,4,9,10-perylenetetracarboxylic acid dianhydride,
4,4′-oxydiphthalic acid dianhydride,
1,2,4,5-naphthalenetetracarboxylic acid dianhydride,
1,4,5,8-naphthalenetetracarboxylic acid dianhydride,
2,3,6,7-naphthalenetetracarboxylic acid dianhydride,
3,3′-isopropylidenediphthalic acid dianhydride,
3,3′-ethylidenediphthalic acid dianhydride,
4,4′-ethylidenediphthalic acid dianhydride,
3,3′-methylenediphthalic acid dianhydride,
2,3,5,6-pyrazinetetracarboxylic acid dianhydride,
2,3,4,5-thiophenetetracarboxylic acid dianhydride,
4,4′-biphthalic acid dianhydride,
3,3′-biphthalic acid dianhydride,
2,3,4,5-pyrrolidonetetracarboxylic acid dianhydride,
1,4-dimethyl-7,8-diphenylbicyclo(2,2,2)octo-7-ene-2,3,5,6-tetracarboxylic acid dianhydride,
1,4,7,8-tetrachlorobicyclo(2,2,2)octo-7-ene-2,3,5,6-tetracarboxylic acid dianhydride,
7,8-diphenylbicyclo(2,2,2)octo-7-ene-2,3,5,6-tetracarboxylic acid dianhydride,
1,8-dimethyldicyclo(2,2,2)octo-7-ene-2,3,5,6-tetracarboxylic acid dianhydride,
1,2,3,4-cyclopentanetetracarbonic acid dianhydride,
ethylenetetracarboxylic acid dianhydride, or
3,3′,4,4′-benzophenonetetracarboxylic acid dianhydride.

The most preferred group Ar in the formula (I) is represented by the following formulae:

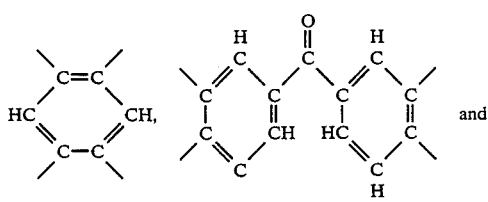

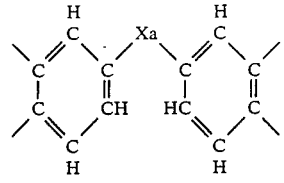

wherein Xa represents —O—, or —CH₂—

The second component of the copolymer of the present invention is diamine represented by the formula (II)

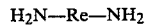

$$H_2N-Re-NH_2 \quad (II)$$

wherein Re represents the same groups as $R_2$ mentioned above.

The preferred examples of the diamine represented by the formula (II) include: 4,4′-diaminodiphenyl ether, 4,4′-isopropylidene-dianiline, 4,4′-methylene-dianiline, benzidine, 3,3′-dichlorobenzidine, 4,4′-thiodianiline, 3,3′-sulfonyl-dianiline, 4,4′-oxydianiline, 1,5-naphthalenediamine, 4,4′-(ethylphosphynilidene)dianiline, 4,4′-(N-methylamino)dianiline, 4,4′-(N-phenylamino)-dianiline, naphthalenediamine, p-phenylenediamine, 2,6-diaminopyridine, 4,4′-methylenedicyclohexyl amine, hexamethylenediamine, heptamethylenediamine, octamethylenediamine, nonamethylenediamine, decamethylenediamine, or 1,4-cyclohexanediamine.

The most preferred diamine of the formula (II) which may be used in the copolymer of the present invention is wherein Re is represented by the following formulae:

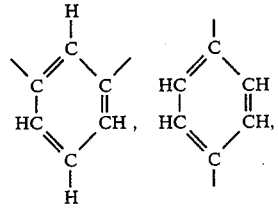

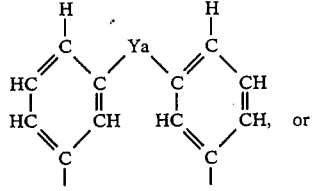

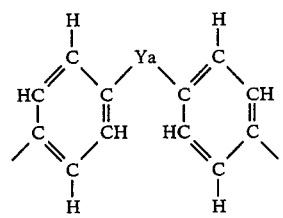

wherein Ya represents —O—,

—$CH_2$—, $H_3C$—$\overset{|}{\underset{|}{C}}$—$CH_3$.

The third component of the copolymer of the present invention is diaminated polyether of the formula (III).

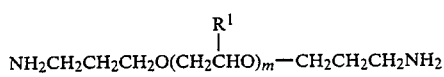
(III)

wherein $R^1$ represents hydrogen or methyl, m represents an integer from 3 to 300.

The diaminated polyether of the formula (III) may be produced by cyanizing the hydroxyl groups on the both ends of polyethylene glycol (PEG) or polypropylene glycol (PPG) by Michael's addition reaction, and by hydrogenating the thus introduced cyano groups under $PtO_2$ catalyst. The polyethylene glycol and polypropylene glycol in which amino groups are thus introduced are hereinafter referred to as PEG amine and PPG amine, respectively. The introduction ratio of the amino groups into the PEG or PPG can be easily adjusted to more than 99%. The degree of polycondensation of the glycol moiety of PEG amine and PPG amine is 3 to 300, and preferably 3 to 200. If the degree of polycondensation is less than 3, the modification of the polyimide is insufficient. If the degree of polycondensation exceeds 300, the polyimide is modified to too great an extent, and its excellent characteristics are degraded.

The percentage of the diaminated polyether of the formula (III) in the total of the diamine of the formula (II) and the diaminated polyether of the formula (III) is 5 to 40% by weight, and preferably 10 to 30% by weight. If the content of the diaminated polyether is less than 5% by weight, the modification of the polyimide is insufficient. If the content is more than 40% by weight, the film-forming property of the polyimide is degraded. Needless to say, the ratio of the organic acid dianhydride of the formula (I) to the total amount of the amines of the formulae (II) and (III) is substantially 1:1 by mole because the copolymer of the present invention is a polycondensation product of acid dianhydride and the amines.

The co-poly (imide ether) copolymer of the present invention may be produced by the following process: The organic acid dianhydride of the formula (I) and the mixture of the amine of the formula (II) and the diaminated polyether of the formula (III) are reacted in a polar solvent at room temperature. The ratio of the diaminated polyether of the formula (III) to the total amines of the formulae (II) and (III) is, as mentioned above, 5:95 to 40:60 by weight. Copolymerized polyamic acid precursor is formed by the above reaction. Then the copolymerized polyamic acid precursor is heated at 200° to 350° C. to obtain the co-poly (imide ether) of the present invention. The heating may be conducted, for example, 3 hours.

Any polar solvent which does not interfer with the copolymerization reaction and which does not react with the formed diamide-dicarboxylic acid can be used in the above process. The preferred polar solvents include, for example, ketones such as N,N-dimethylformamide, N,N-dimethylacetamide, N,N-diethylacetamide, N,N-dimethylmethoxyacetamide, N-methylcaprolactam, dimethylsulfoxide, N-methyl-2-pyrrolidone, tetramethylene urea, pyridine, dimethylsulfone, hexamethylphosphoric acid amide, tetramethylenesulfone, formamide, butyrolactone, N-acetyl-2-pyrrolidone and methylethylketone and nitroalkanes such as nitroethane, and nitropropane. The most preferred polar solvent is N,N-dimethylformamide and N,N-dimethylacetamide. The solvents can be used independently or in combination. Further, the polar solvents may be used in combination with solvents such as benzene, benzonitrile, dioxane, xylene, toluene and cyclohexane.

The present invention will be readily understood by referring to the following examples. It should be noted that the following examples are presented for the purpose of illustration only, and many modifications can easily be made by those skilled in the art without departing from the scope or spirit of the present invention.

EXAMPLE 1

To a two neck flask provided with a three way stopcock, 0.943 g ($4.74 \times 10^{-3}$ mole) of 4,4'-diaminodiphenyl ether, 0.105 g ($0.26 \times 10^{-3}$ mole) of PEG amine (average degree of polycondensation=6.45, number-average molecular weight Mn=400), and 20 ml of N,N-dimethylacetamide are added under a purging with nitrogen. To this mixture, is added 1.09 g ($5 \times 10^{-3}$ mole) of pyromellitic acid anhydride while stirring the mixture with a magnetic stirrer and retaining the mixture in a water bath. The mixture is then reacted for 2 hours. The mixture gradually became viscose.

The relative viscosity $\eta$ sp/c in N,N-dimethylacetamide of thus obtained copolymerized polyamic acid (under the concentration of 0.5 g/10 ml, at 30° C.) is 1.96. An aliquot of the solution was casted on a glass plate and the casted solution is heated at 50° C. for 1 hour and then at 150° C. for 1 hour to remove the solvent. The copolymerized polyamic acid precursor is then heated at 250° C. for 3 hours in an electric furnace to complete the imidization. After cooling, a transparent yellow film of a uniform thickness of 25 μm is separated by peeling off the film from the glass plate. The IR spectrum of this film showed absorption at 3150 cm$^{-1}$ (phenyl group) and 1780, 1730 cm$^{-1}$ (imide group), as well as 2930 cm$^{-1}$ and 1150 cm$^{-1}$ attributable to the existence of the polyether. Differential thermal analysis (DTA) of the film showed a broad heat-absorption peak at 200° to 300° C. which is considered to be glass transition point. The weight loss determined by a thermobalance (TGA) is 1% or less at 300° C. and 9% at 500° C. The film is folded and is placed on a hot-press, and is subjected to a deformation at 250° C., 100 atm. The film is slightly fused and a permanent deformation is left to the film. Further, the thickness of the film is lessened to 20 μm or less. Thus, the great shapeability of the copolymer of the present invention is proved.

EXAMPLE 2

In the similar manner as in Example 1, 0.914 g ($4.56 \times 10^{-3}$ mole) of 4,4'-diaminodiphenyl ether and 3.61 g ($0.44 \times 10^{-3}$ mole) of PEG amine (average degree of polycondensation=182, number-average molecular weight=8,300) are dissolved in 50 ml of N,N-dimethylacetamide. While cooling the mixture in a water bath and stirring the mixture, 1.09 g ($5 \times 10^{-3}$ mole) of pyromellitic acid anhydride is added to the mixture and the mixture is allowed to react for 2 hours. The reaction mixture gradually became viscose. The thus obtained copolymerized polyamic acid has a relative viscosity of 0.43 in N,N-dimethylacetamide under a concentration of 0.5 g/10 ml, at 30° C.

As in Example 1, a co-poly (imide ether) film is prepared from this solution. A transparent yellow film was obtained but its strength is weaker than that of the film in Example 1, and the film is torn when strongly stretched with hands. The weight loss in TGA was 18% at 300° C., and 79% at 500° C. However, like the film in Example 1, the film showed fusion when subjected to hot-press as in Example 1, which shows a great shapeability of the film.

EXAMPLE 3

In the similar manner as in Example 1, 0.94 g (4.74×10$^{-3}$ mole) of p,p'-methylenedianiline and 0.104 g (0.26×10$^{-3}$ mole) of PEG amine (degree of polycondensation=6.45, number-average molecular weight=400) are dissolved in 24 ml of N,N-dimethylacetamide. To this solution, 1.61 g (5×10$^{-3}$ mole) of 3,3',4,4'-benzophenonetetracarboxylic acid dianhydride is added and the mixture is allowed to react. The relative viscosity of the thus formed copolymerized polyamic acid precursor in N,N-dimethylacetamide is 0.69 under a concentration of 0.5 g/10 ml, at 30° C. A film is prepared from this solution as in Example 1, to obtain a transparent yellow film of a uniform thickness of 29 μm. The IR spectrum of the film showed absorptions at 1780 and 1730 cm$^{-1}$ attributable to the existence of imide group and 1690 cm$^{-1}$ attributable to the existence of carbonyl group, both of which shows that the film is polyimide-based, as well as the absorptions at 2930 and 1150 cm$^{-1}$ attributable to the existence of polyether. The softening point of the film was about 170° to about 220° C. The film showed fusion by a hot-press at 250° C., 100 atms, which shows the high shapeability of the film. Further, the weight loss in TGA is about 2% at 300° C., and about 10% at 500° C., which shows the high heat resistance of the film.

EXAMPLE 4

To a 50 ml two neck flask, 3.61 g (0.44 mmol) of PEG amine (number-average molecular weight=8300) is added, and then 50 ml of N,N-dimethylamide is added to the flask. The flask is heated at 60° C. to solve the PEG amine. After cooling, 0.914 g (4.56 mmol) of 4,4'-diaminodiphenyl ether is solved in the solution. While vigorously agitating the solution, is added slowly 1.09 g (5 mmol) of pyromellitic acid anhydride. After reacting the mixture for 2 hours at room temperature, the reaction mixture became viscose. By using the same process as in Example 1, a yellow film with a uniform thickness of 25 μm was obtained from the thus formed polyamic acid solution.

EXAMPLE 5

Various films are prepared in compliance with the process of Examples 1, 2 or 4, and the film-forming property thereof and gas permeability to oxygen and nitrogen are determined. The results are summarized in the Tables 1 and 2. As can be seen from Table 2, it is proved that the gas-separation ability of the co-poly (imide ether) films of the present invention are very great.

TABLE 1

| Mn of PEG Amine | PEG Amine/ Diamine | Relative Viscosity | Film Formation | DTA $T_g$ (°C.) |
|---|---|---|---|---|
| 400 | 0/100 | 3.96 | very good | 300 |
| 400 | 5/95 | 2.61 | good | 300 |
| 400 | 10/90 | 1.96 | good | 200–300 |
| 400 | 20/80 | 1.02 | fair | 180–300 |
| 400 | 30/70 | 0.67 | moderate | 170–300 |
| 400 | 50/50 | 0.43 | very bad | 80–300 |
| 6000 | 10/90 | 3.86 | good | 200–300 |

TABLE 1-continued

| Mn of PEG Amine | PEG Amine/ Diamine | Relative Viscosity | Film Formation | DTA $T_g$ (°C.) |
|---|---|---|---|---|
| 6000 | 20/80 | 3.53 | good | 180–300 |

TABLE 2

| Mn | PEG Amine % by Weight in Total Diamines | Measuring Temperature | Coefficient of Permeability* $O_2$ | $N_2$ | $O_2/N_2$ |
|---|---|---|---|---|---|
| — | 0 | Room T. | 3.5 | 2.9 | 1.2 |
| 400 | 5 | Room T. | 3.5 | 1.6 | 2.2 |
| 400 | 10 | Room T. | 3.9 | 1.2 | 3.3 |
| 400 | 20 | Room T. | 5.3 | 1.4 | 3.8 |
| 400 | 80 | Room T. | 19.0 | 12.0 | 1.6 |
| 400 | 90 | Room T. | 31.0 | 23.0 | 1.3 |
| 400 | 95 | Room T. | — | — | — |
| 6000 | 20 | Room T. | 6.0 | 1.6 | 3.8 |
| 6000 | 20 | 60° C. | 9.5 | 4.2 | 2.3 |
| 6000 | 20 | 70° C. | 12.0 | 8.5 | 1.4 |
| 6000 | 90 | Room T. | 5.1 | 2.2 | 2.3 |
| 6000 | 95 | Room T. | 4.2 | 2.0 | 2.1 |

*$P \times 10^{11}$
cc (STP) cm/cm$^2$ · sec · cmHg

I claim:

1. A process for separating oxygen from a gas mixture containing oxygen, comprising passing the gas mixture through a film which comprises a co-poly (imide ether) copolymer consisting essentially of:

(A) organic acid dianhydride of the formula (I):

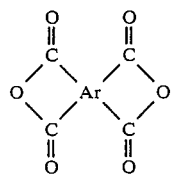

wherein Ar represents

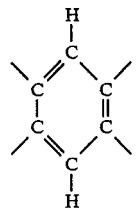

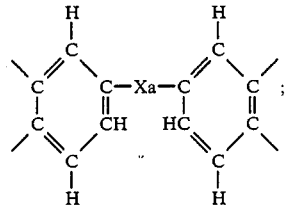

wherein X a represents —O— or —CH$_2$—,

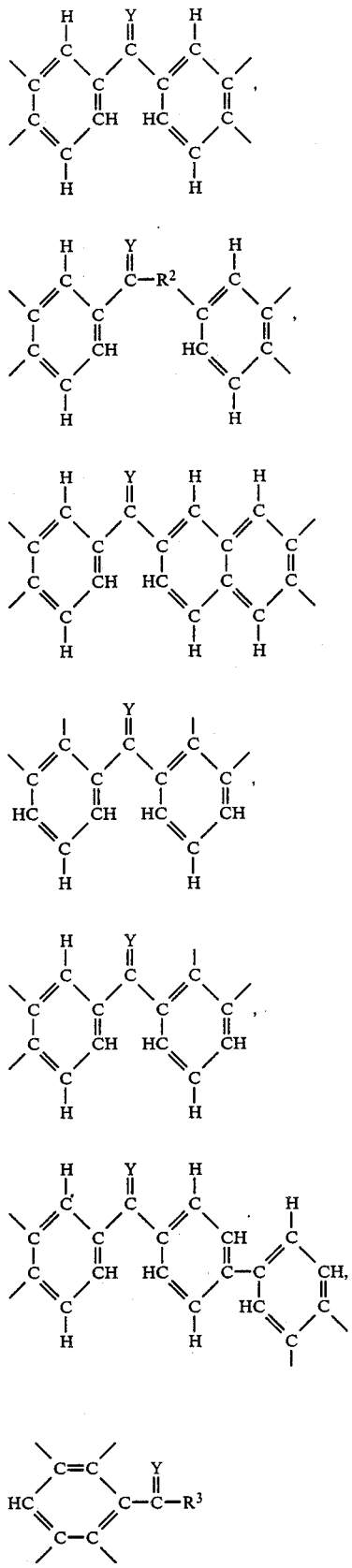
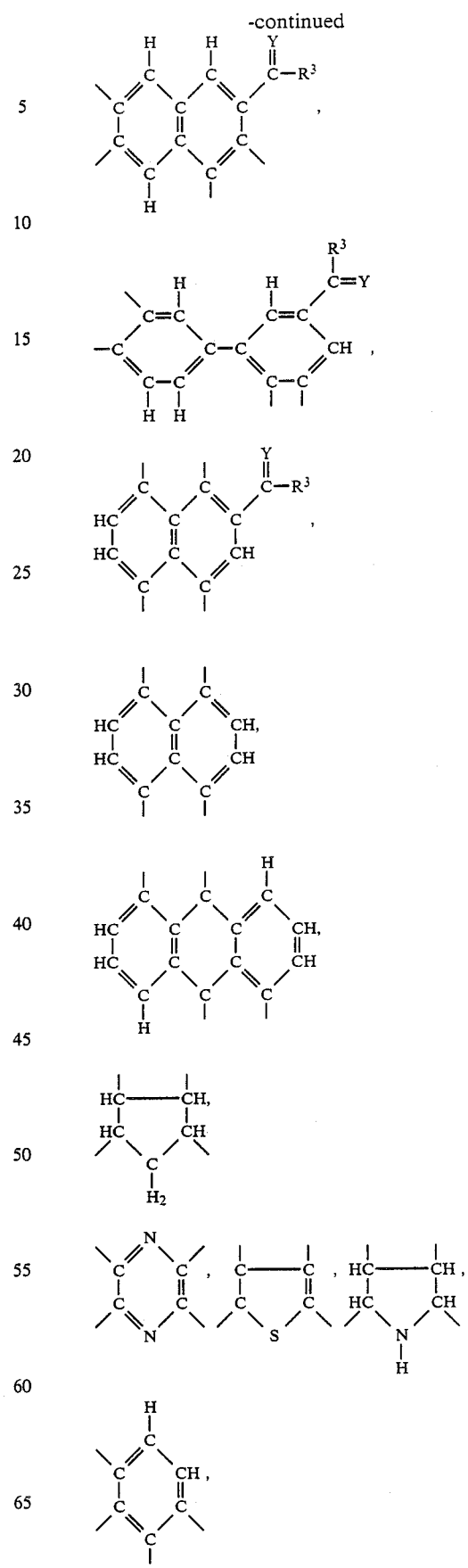

-continued

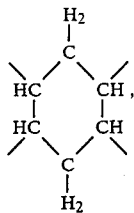

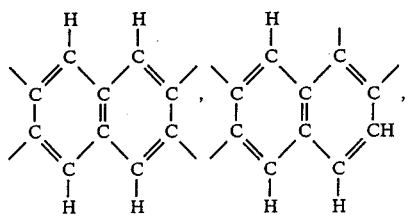

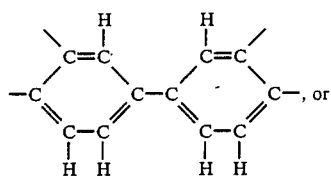, or

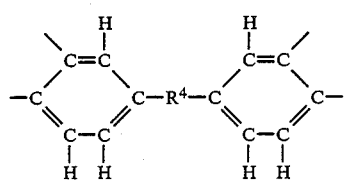

wherein =Y represents =O or =N—R$^5$—NH$_2$, wherein R$^5$ represents a divalent organic group, R$^2$ represents alkylene or arylene, R$^3$ represents alkyl, and R$^4$ represents an alkylene group having at least 2 carbon atoms, (B) diamine of the formula (II)

H$_2$N—Re—NH$_2$    (II):

wherein Re represents

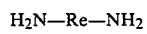

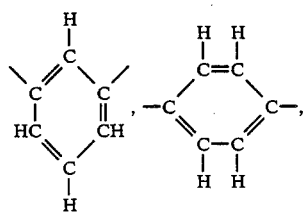

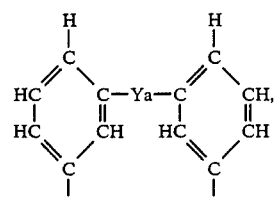

-continued

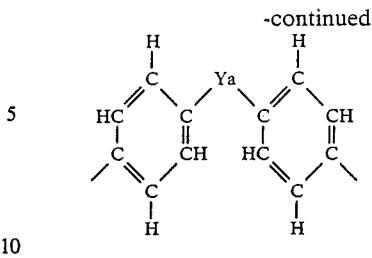

wherein Ya represents

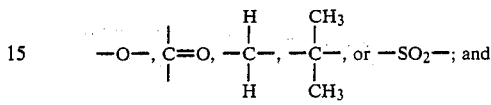

(C) di-aminated poly ether of the formula (III):

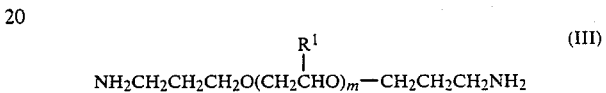

wherein R$^1$ represents hydrogen or methyl, m represents an integer from 3 to 300;

the percentage of the component (C) in the total of the components (B) and (C) being 5 to 40% by weight, the molecular weight of the co-poly (imide ether) copolymer being 5,000 to 100,000.

2. The process of claim 1, wherein the group Ar in the formula (I) represents

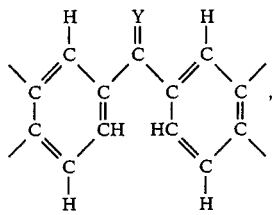

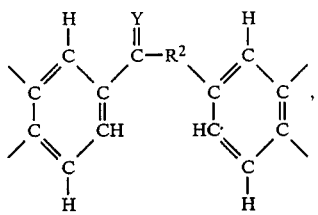

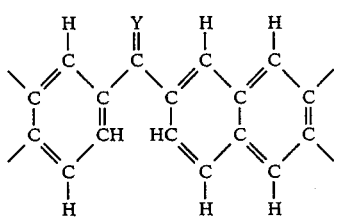

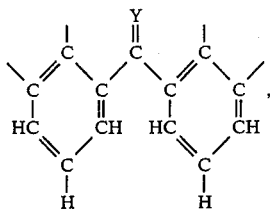

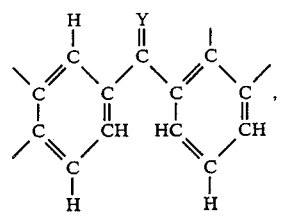
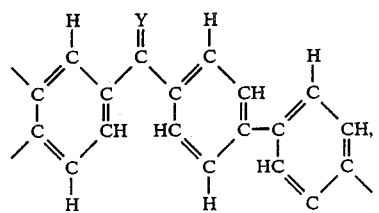
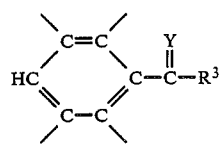
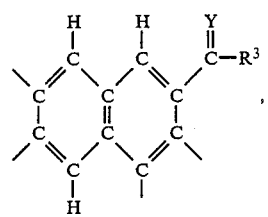
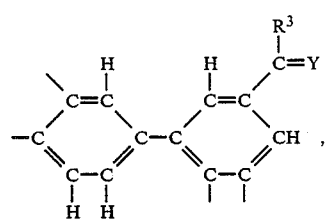
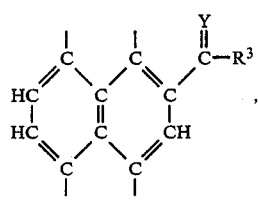
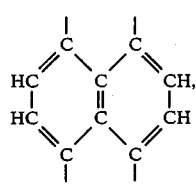
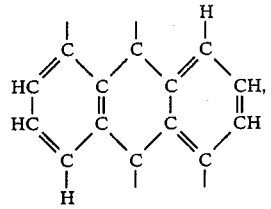
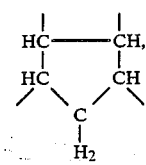
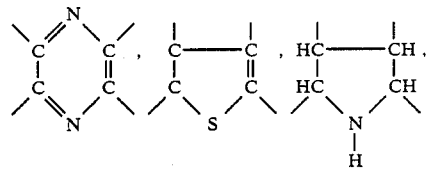
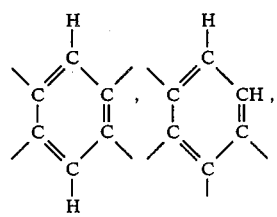
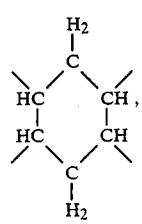
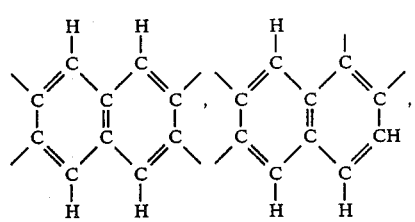
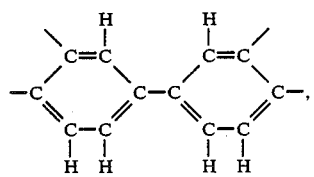
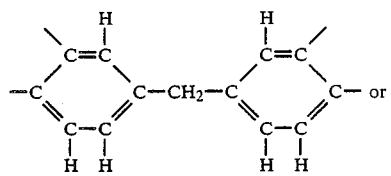

-continued $$\begin{array}{c} \diagdown \\ -C \end{array} \begin{array}{c} H \\ | \\ C=C \\ | \\ C-C \\ | \\ H \end{array} \begin{array}{c} H \\ | \\ C-R^4-C \\ | \\ H \end{array} \begin{array}{c} H \\ | \\ C=C \\ | \\ C-C \\ | \\ H \end{array} \begin{array}{c} \diagup \\ C- \\ \diagdown \end{array}$$

wherein =Y represents =O or =N—$R^5$—$NH_2$, wherein $R^5$ represents a divalent organic group, $R^2$ represents alkylene, $R^3$ represents alkyl, and $R^4$ represents an alkylene group having at least 2 carbon atoms.

3. The process of claim 1, wherein the group Ar in the formula (I) represents

[chemical structures]

or

[chemical structure with Xa]

wherein Xa represents —O— or —$CH_2$—.

4. The process of claim 1, wherein the diamine of the formula (II) is 4,4'-diaminodiphenyl ether, 4,4'-isopropylidene-dianiline, 4,4'-methylene-dianiline, benzidine, 3,3'-dichlorobenzidine, 4,4'-thiodianiline, 3,3'-sulfonyl-dianiline, 4,4'-oxydianiline, 1,5-naphthalenediamine, 4,4'-(ethylphosphynilidène)dianiline, 4,4'-(N-methylamino)dianiline, 4,4'-(N-phenylamino)dianiline, naphthalenediamine, p-phenylenediamine, 2,6-diaminopyridine, 4,4'-methylenedicyclohexyl amine, hexamethylenediamine, heptamethylenediamine, octamethylenediamine, nonamethylenediamine, decamethylenediamine, or 1,4-cyclohexanediamine.

5. The process of claim 1, wherein the integer m in the formula (III) is 3 to 200.

6. The process of claim 1, wherein the ratio of the component (B) to component (C) is 90:10 to 70:30 by weight.

7. The process of claim 1, wherein the organic acid dianhydride is pyromellitic acid dianhydride, 3,3',4,4'-diphenyltetracarboxylic acid dianhydride, 1,2,5,6-naphthalenetetracarboxylic acid dianhydride, 2,2'3,3'-diphenyltetracarboxylic acid dianhydride, 4,4'-isopropylidenediphthalic acid dianhydride, 4,4'-sulfonyl-diphthalic acid dianhydride, 3,4,9,10-perylenetetracarboxlic acid dianhydride, 4,4'-oxydiphthalic acid dianhydride, 1,2,4,5-naphthalenetetracarboxylic acid dianhydride, 1,4,5,8-naphthalenetetracarboxylic acid dianhydride, 2,3,6,7-naphthalenetetracarboxylic acid dianhydride, 3,3'-isopropylidenediphthalic acid dianhydride, 3,3'-ethylidenediphthalic acid dianhydride, 4,4'-ethylidenediphthalic acid dianhydride, 3,3'-methylenediphthalic acid dianhydride, 2,3,5,6-pyrazinetetracarboxylic acid dianhydride, 2,3,4,5-thiophenetetracarboxylic acid dianhydride, 4,4'-biphthalic acid dianhydride, 3,3'-biphthalic acid dianhydride, 2,3,4,5-pyrrolidonetetracarboxylic acid dianhydride, 1,4-dimethyl-7,8-diphenylbicyclo(2,2,2)octo-7-ene-2,3,5,6-tetracarboxylic acid dianhydride, 1,4,7,8-tetrachlorobicyclo(2,2,2)octo-7-ene-2,3,5,6-tetracarboxylic acid dianhydride, 7,8-diphenylbicyclo(2,2,2)octo-7-ene-2,3,5,6-tetracarboxylic acid dianhydride, 1,8-dimethyldicyclo(2,2,2)-octo-7-ene-2,3,5,6-tetracarboxylic acid dianhydride, 1,2,3,4-cyclopentanetetracarboxylic acid dianhydride, ethylenetetracarboxylic acid dianhydride, or 3,3',4,4'-benzophenonetetracarboxylic acid dianhydride.

* * * * *